(12) United States Patent
Behrends et al.

(10) Patent No.: US 9,819,180 B2
(45) Date of Patent: Nov. 14, 2017

(54) METHOD FOR SEQUENTIALLY DISCONNECTING/CONNECTING ELECTRICAL CURRENT SOURCES FROM/TO A COMMON LOAD

(71) Applicant: SMA Solar Technology AG, Niestetal (DE)

(72) Inventors: Holger Behrends, Kassel (DE); Marcel Kratochvil, Kassel (DE); Markus Hopf, Espenau (DE)

(73) Assignee: SMA Solar Technology AG, Niestetal (DE)

( * ) Notice: Subject to any disclaimer, the term of this patent is extended or adjusted under 35 U.S.C. 154(b) by 1200 days.

(21) Appl. No.: 13/896,407

(22) Filed: May 17, 2013

(65) Prior Publication Data
US 2013/0307343 A1 Nov. 21, 2013

(30) Foreign Application Priority Data
May 18, 2012 (DE) .................. 10 2012 104 315

(51) Int. Cl.
H01L 31/042 (2014.01)
H02J 1/10 (2006.01)
H02J 3/38 (2006.01)

(52) U.S. Cl.
CPC .............. *H02J 1/10* (2013.01); *H02J 3/383* (2013.01); *Y02E 10/563* (2013.01); *Y10T 307/724* (2015.04)

(58) Field of Classification Search
CPC .......... H02J 1/10; H02J 3/383; Y10T 307/724
See application file for complete search history.

(56) References Cited

U.S. PATENT DOCUMENTS 4,445,183 A * 4/1984 McCollum .......... H02H 3/0935
    361/13
4,992,904 A * 2/1991 Spencer ................ H02H 3/087
    361/13
(Continued)

FOREIGN PATENT DOCUMENTS

DE         10155795 C1    7/2003
DE    202004011873 U1  11/2004
(Continued)

OTHER PUBLICATIONS

Subject 1699B; Outline of Investigation for "Photovoltaic (PV) DC Arc-Fault Circuit Protection"; Issue 1; Apr. 29, 2011; p. 1-32.
(Continued)

*Primary Examiner* — Rexford Barnie
*Assistant Examiner* — Terrence Willoughby
(74) *Attorney, Agent, or Firm* — Eschweiler & Potashnik, LLC

(57) ABSTRACT

The disclosure relates to methods for sequentially disconnecting at least two electrical current sources from a common load or for sequentially connecting the current sources to a load, wherein the current sources are each connected to the common load via a switching unit, each comprising a parallel circuit comprising an electromechanically actuated switch and an associated semiconductor switch. In the two methods, first semiconductor switches are closed if they are still not closed and the relevant electromechanical switches are opened. In the method for sequential disconnection, then at least two of the semiconductor switches that were actuated or that were already closed are opened sequentially. In the method for sequential connection, a plurality of the semiconductor switches are first opened, of which then at least two are closed sequentially. The disclosure also relates
(Continued)

to a photovoltaic system comprising an apparatus that is suitable for implementing the method.

29 Claims, 5 Drawing Sheets

(56) References Cited

U.S. PATENT DOCUMENTS

| | | |
|---|---|---|
| 7,683,575 B2 | 3/2010 | Berdichevsky et al. |
| 2004/0027734 A1 | 2/2004 | Fairfax et al. |
| 2011/0267721 A1* | 11/2011 | Chaintreuil ........ G01R 31/1209 361/2 |
| 2012/0053867 A1* | 3/2012 | Dunn ...................... H02S 50/10 702/58 |
| 2012/0174961 A1* | 7/2012 | Larson .............. H01L 31/02021 136/246 |
| 2013/0015875 A1* | 1/2013 | Kumar ................... H02S 50/10 324/761.01 |

FOREIGN PATENT DOCUMENTS

| | | |
|---|---|---|
| DE | 102008057874 A1 | 5/2010 |
| JP | 2011019312 A | 1/2011 |

OTHER PUBLICATIONS

UL 1699B; Outline of Investigation for "Photovoltaic (PV) DC Arc-Fault Circuit Protection"; Issue 2; Jan. 14, 2013; p. 1-42.

\* cited by examiner

METHOD FOR SEQUENTIALLY DISCONNECTING/CONNECTING ELECTRICAL CURRENT SOURCES FROM/TO A COMMON LOAD

REFERENCE TO RELATED APPLICATION

This application claims priority to German application number 10 2012 104 315.9 filed on May 18, 2012, the contents of which are incorporated herein by reference in their entirety.

FIELD

The disclosure relates to methods for sequentially disconnecting and sequentially connecting, respectively, at least two electrical current sources from or to a common load, wherein the current sources are each connected to the common load via switching units, each having a parallel circuit comprising an electromechanically actuated switch and an associated semiconductor switch.

BACKGROUND

Such an arrangement with often a plurality of, but at least two, electrical current sources which are connected to a common load via the switching units can be provided, for example, in a photovoltaic (PV) system. The individual current sources are in this case parts or regions of the photovoltaic (PV) generator, referred to below as PV subgenerators, which are connected to a DC input circuit of an inverter as common load. In such PV systems, isolation, under certain circumstances also galvanic isolation or even galvanic isolation at all poles, is generally required between the PV subgenerators and the inverter, which isolation is implemented by an electromechanical switch. An electromechanical switch is understood to mean an electromechanically actuated switch, actuated by an electric motor or an electromagnet, for example. Switches actuated by an electromagnet are also referred to as relays or contactors.

In order to prevent switching on load of these electromechanical switches resulting in the formation of an arc at the switching contacts of the switches, semiconductor switches are often used in parallel with the electromechanical switches. The semiconductor switches bypass the electromechanical switch temporarily during the switching operation and thus prevent the formation of an arc. Such an arrangement of a switching unit with an electromechanically actuated switch and a semiconductor switch arranged in parallel therewith is known, for example, from the document DE 10 2008 057 874 A1. Starting from a closed electromechanical switch and an open semiconductor switch, in order to disconnect a PV subgenerator from the inverter, for example, first the semiconductor switch is closed and then the electromechanical switch is opened, wherein an arc is prevented since there is no or only a small potential difference between the switching contacts. Finally, the semiconductor switch is opened.

During operation of a PV system, operating states can occur, in which it is desirable for all of the PV subgenerators to be disconnected, also called isolated, from the input of the inverter successively as quickly as possible. Such a situation can arise, for example, when an arc detector arranged in the load circuit indicates the presence of an arc in one of the PV subgenerators. In particular in the case of large PV systems, simultaneously decoupling of the entire PV generator, i.e. simultaneous decoupling of all of the PV subgenerators, is undesirable since instabilities can occur in the power supply system to which the inverter feeds. In addition, subsequent faultfinding is complex since, in the case of such simultaneous disconnection of all of the PV subgenerators, no localization of the arc can take place.

If, on the other hand, the PV subgenerators are isolated from the DC input circuit of the inverter successively, the location of the arc can be restricted at least to the level of the PV subgenerators. Such a method for localizing an arc is described in the document DE 101 55 795 C1 in connection with a motor vehicle power supply system that has a plurality of subsystems. Owing to the inertia of the electromechanical switches, via which the PV subgenerators are connected to the inverter, a single switching operation does have, however, a minimum switching duration which can be in the region of a few tens of milliseconds. In the case of large PV systems, with a correspondingly large number of PV subgenerators, sequential disconnection can then take a few seconds, under certain circumstances. In the most unfavorable case, the arc remains until disconnection of the last PV subgenerator, i.e. over the entire duration of the switching sequences. This is undesirable for safety reasons, for example owing to a fire hazard originating from an arc, and is also impermissible under certain circumstances, for example in accordance with the US standard UL1699B.

In other operating states, however, it may be desirable to connect PV subgenerators to an inverter sequentially as quickly as possible.

Some aspects of the present disclosure provide methods for disconnecting current sources, for example PV subgenerators, from a common load, for example an inverter, sequentially and as quickly as possible or connecting the current sources to this common load sequentially and as quickly as possible.

This aspect can be achieved by the methods for sequential disconnection or sequential connection comprising the features of the independent claims. Advantageous configurations are given in the dependent claims.

A method of sequential disconnection according to the disclosure of the type mentioned at the outset comprises the following steps: Semiconductor switches that are associated with a closed electromechanical switch are closed if they are not already closed and then the respective electromechanical switches are opened. In a preferred embodiment of the invention the opening of the respective electromechanical switches takes place simultaneously or at least nearly simultaneously. Then, at least two of the semiconductor switches that were actuated in the first step or that were already closed are opened sequentially.

A method according to the invention for sequential connection of the type mentioned at the outset comprises the following steps: Semiconductor switches which are associated with a closed electromechanical switch are closed if they are not already closed, and then the respective electromechanical switches are opened. In a preferred embodiment of the disclosure the opening of the respective electromechanical switches takes place simultaneously or at least nearly simultaneously. Then, a plurality of the semiconductor switches are opened, of which then at least two semiconductor switches are in turn closed sequentially.

Both methods are based on the basic concept of using the semiconductor switches for implementing the switching sequence, i.e. for successive (sequential) connection of the load to or disconnection (isolation) of the load from the individual current sources, instead of the electromechanical switches. For this purpose, first the switching state of the electromechanical switches is transferred to the associated semiconductor switches. These can then be opened successively quickly or first be opened jointly and closed quickly successively. The semiconductor switches which are generally arranged in parallel with an electromechanical switch as protection against a switching arc can thus be used to disconnect or connect a load from or to a plurality of current sources quickly and sequentially.

In an advantageous embodiment of the method, a semiconductor switch actuated during the sequential opening or sequential closing remains opened or closed until all of the semiconductor switches to be actuated sequentially have been actuated. In a preferred embodiment, after completion of a sequential closing of the semiconductor switches, the associated electromechanically actuated switches are closed.

Alternatively, a semiconductor switch actuated during the sequential opening or sequential closing is first closed or opened again before a next semiconductor switch is actuated sequentially.

In a further advantageous embodiment of the method, the sequential opening or the sequential closing of the semiconductor switches is characterized by an opening or closing of in each case an individual one of the semiconductor switches. Alternatively, the sequential opening or the sequential closing of the semiconductor switches is characterized by a simultaneous opening or simultaneous closing of in each case a plurality of the semiconductor switches. Thus, switches can be operated individually or in groups comprising two or more individual switches.

In a further advantageous embodiment of the method, after completion of the sequential opening or sequential closing of the semiconductor switches, the following additional steps are performed:

A subset of current sources that are intended to be connected to the common load again is established.

All of the semiconductor switches of the current sources which belong to the subset if the semiconductor switches are not already closed, are closed. Then, all of the electromechanically actuated switches of the current sources which belong to the subset are closed. It is preferred that the current sources that are not intended to be connected to the common load again, are galvanically isolated from the load.

In accordance with a further aspect of the disclosure, the above-described method is used for localizing and quenching an arc in a PV generator in a PV system, wherein the PV generator comprises at least two PV subgenerators as current sources that are connected, via switching units, to a DC input of an inverter as common load.

In accordance with a further aspect of the disclosure, the above-described method is used for determining partial currents in a PV generator in a PV system, wherein the PV generator comprises at least two PV subgenerators as current sources, which are connected, via switching units, to a DC input of an inverter as common load, wherein a current measurement device for measuring a current through the load is provided.

The above-described methods for sequentially disconnecting or connecting individual current or voltage sources from or to a common load can also be used to localize a possible insulation fault within a plurality of PV subgenerators connected in parallel quickly, as a means of determining the insulation resistance ($R_{INS}$ measurement) of a PV generator. The faulty PV subgenerator can then be galvanically isolated permanently after identification of an insulation fault. Equally, it is conceivable to determine discharge currents and the discharge capacitances causing the discharge currents of individual PV subgenerators quickly using only one (centrally arranged) measurement system.

In the case of PV systems, switching units via which PV subgenerators can be connected to an inverter generally comprise a parallel circuit comprising an electromechanical switching element and a semiconductor switch that protects the contact path of the electromechanical switching element from a switching arc. The method according to the disclosure can advantageously be used for being able to localize a detected arc quickly. The quick switching sequence also makes it possible to implement a multiplexing method for an individual measurement of partial currents in individual PV subgenerators using only one current measurement device without any significant losses in yield.

BRIEF DESCRIPTION OF THE DRAWINGS

The disclosure will be explained in more detail below with reference to exemplary embodiments with the aid of five figures, in which.

DETAILED DESCRIPTION

Figure 1:
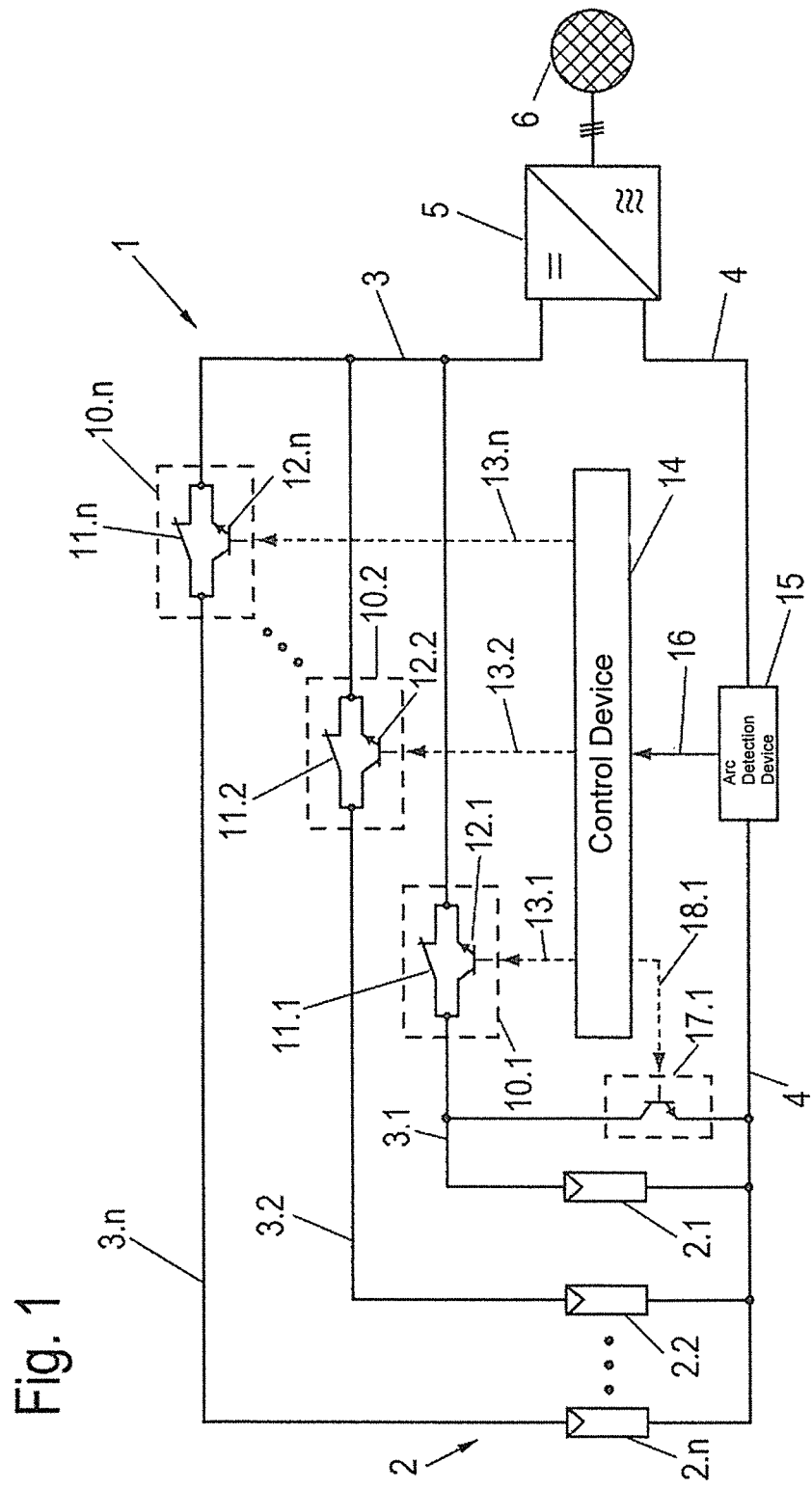
FIG. 1 shows a block circuit diagram of a PV system.

FIG. 1 shows schematically in a block circuit diagram the basic design of a PV system 1, within which a method according to the application can be implemented. The PV system 1 comprises a PV generator 2 that comprises a number n, in this case n=3, for example, of PV subgenerators 2.1, 2.2 to 2.n. Each of the PV subgenerators 2.1-2.n can comprise, for example, a string or a parallel circuit of strings, wherein a string represents an arrangement of a plurality of PV modules connected in series. By way of example, the PV subgenerators 2.1-2.n are symbolized by the circuit symbol of an individual photovoltaic cell in the figure.

The PV subgenerators 2.1-2.n are connected to a DC input circuit of an inverter 5 via DC lines 3, 4. On the output side, the inverter 5 is coupled to a power supply system 6 for feeding power.

The power supply system 6 can be a public power supply grid or a private power supply system (stand-alone power supply system). For example, the inverter 5 is designed to have three AC outputs for a three-phase feed to the power supply system 6. It goes without saying that a design of the inverter 5 and/or the power supply system 6 other than the three-phase design illustrated is also possible, for example a single-phase design. In addition, only the parts of the PV system 1 which are essential in the context of the application are illustrated in FIG. 1. Further elements arranged on the DC or AC side of the inverter 5, such as further isolating or switching elements, filters, monitoring devices or transformers, for example, are not illustrated for reasons of clarity.

In the example shown, the PV subgenerators 2.1-2.n are connected with one of their connections, in this case the cathode, for example, directly to one another and to the DC line 4. The other connection of the PV subgenerators, in this case the anode, in each case leads to in each case one switching unit 10.1, 10.2 to 10.n via separate current paths 3.1, 3.2 to 3.n. The respective corresponding PV subgenerator 2.1-2.$n$ is then connected to the common DC line 3 and the inverter 5 via the respective switching unit 10.1, 10.2 to 10.$n$.

Each of the switching units 10.1-10.$n$ comprises a parallel circuit comprising an electromechanical switch 11.1, 11.2 to 11.$n$ and a semiconductor switch 12.1, 12.2 to 12.$n$. The respective electromechanical switch 11.1-11.$n$ is, for example, formed by a contact pair comprising a contactor or relay. In the exemplary embodiment illustrated, the electromechanical switches 11.1-11.$n$ are in the form of normally closed switches. For simplification purposes, the electromechanical switches 11.1-11.$n$ are referred to below as switches 11.1-11.$n$. The semiconductor switches 12.1-12.$n$ are illustrated as bipolar transistors by way of example. However, other semiconductor switches, for example MOSFETs (Metal-Oxide Semiconductor Field-Effect Transistor) or IGBTs (Insulated-Gate Bipolar Transistors) can also be used at this point. If appropriate, in this case diodes are associated with the semiconductor switches in order to prevent reverse currents. The use of two transistors connected in a back-to-back configuration is also possible for implementing a bidirectionally operating semiconductor switch. Alternatively, the use of a unidirectionally operating semiconductor switch between the rectifying connections of a full-bridge rectifier is also possible.

The PV subgenerators 2.1-2.$n$ as electrical current sources can be connected or disconnected, via the switching units 10.1-10.$n$, individually via the DC line 3, 4 to or from the DC input circuit of the inverter 5 as load. In order to actuate the switching units 10.1-10.$n$, the switching units are connected to a control device 14 via control lines 13.1, 13.2 to 13.$n$. These components are designed in such a way that the switches 11.1-11.$n$ and the semiconductor switches 12.1-12.$n$ can be switched individually and independently of one another. In particular, the electromechanical switches 11.1-11.$n$ associated with in each case one switching unit 10.1-10.$n$ can be switched independently of the respective associated semiconductor switch 12.1-12.$n$. In the exemplary embodiment illustrated, individual control lines 13.1-13.$n$ from the control device 14 to the switching units 10.1-10.$n$ are provided. However, it is also possible to implement the actuation via a network link, wherein the network link can have a different topology than the point-to-point topology shown. Actuation can also take place via radio or via a radio network or via a control signal modulated onto the DC line 3, 4. The latter is also known as PLC (Power Line Communications).

In order to localize and quench so-called parallel arcs, it is advantageous to provide further switching units 17.1-17.$n$ in addition to the switching units 10.1-10.$n$. The individual PV subgenerators 2.$i$ can be short-circuited selectively via the further switching units 17.1-17.$n$. For reasons of clarity of the illustration, only one of these further switching units, the switching unit 17.1, is illustrated by way of example in connection with the PV subgenerator 2.1 in FIG. 1. In order to short-circuit the PV subgenerators 2.2 to 2.$n$, similarly arranged further switching units 17.2-17.$n$ are provided. The further switching units 17.1-17.$n$ are implemented by additional semiconductor switches, for example, whose first connection is connected in each case to the DC line 3.$i$, wherein this connection is located between the PV subgenerator 2.$i$ and the switching element 10.$i$ associated with this PV subgenerator. The second connection of the additional switching units 17.$i$ is connected to the DC line 4. In the normal state, the switching units 17.1-17.$n$ are open, with the result that the associated PV subgenerators are live. If required, individual switching units 17.$i$ are now actuated selectively by the associated control line 18.$i$, of which only the control line 18.1 is illustrated in FIG. 1. In the actuated (closed) state, the switching unit 17.$i$ is capable of short-circuiting the PV subgenerator 2.$i$ selectively under certain boundary conditions, i.e. when the switch 11.$i$ is open and the semiconductor switch 12.$i$ is open.

Possibly, in each case one relay can be connected in parallel with the semiconductor switches of the further switching units 17.1-17.$n$. This is particularly advantageous when, for example, after an identified parallel arc, for example, it is intended for the short circuit case to be maintained permanently. If it is sure that the short-circuited state is intended to be maintained over a relatively long period of time, the power loss at the semiconductor switch can be minimized via closing of the relay arranged in parallel. The switching units 17.1-17.$n$ are referred to below as semiconductor switches for reasons of simplicity (but with no limiting effect).

Furthermore, a device 15 for arc detection is provided in the PV device 1, which device for arc detection signals the presence of an arc in the DC circuit at a signal output 16. The signal at the signal output 16 is supplied to the control device 14. In the example illustrated, the device 15 for arc detection is looped into the DC line 4. An arc detection can take place, for example, by virtue of radiofrequency components being coupled out of the DC circuit and analyzed. An arc can be identified from its characteristic emission spectrum. An identified arc can be present anywhere in the PV device 1. For example, a broken wire or other faulty connection one or more current sources and common load can lead to an arc being detected in PV system.

A method for quenching and localizing an identified arc in a circuit is illustrated below using a flowchart in FIG. 2. The method can be implemented, for example, within the PV system shown in FIG. 1. Therefore, the method is explained by way of example with reference to FIG. 1 and using the reference symbols in FIG. 1. The method illustrated for localizing an arc represents an example of a method which makes use of the method according to the application for sequentially disconnecting current sources from a common load.

It is assumed that, at the beginning of the method, the PV system 1 is in a normal operating state, in which all of the semiconductor switches 12.1-12.$n$ are not actuated and are therefore open and all of the switches 11.1-11.$n$ are closed. All of the PV subgenerators 2.1-2.$n$ are consequently connected to the inverter 5.

In a first step S 21 of the method, the device 15 for arc detection of the PV system 1 is activated. In a subsequent step S 22, an enquiry is made to ascertain whether an arc is identified in the DC circuit. This step S 22 can be implemented, for example, within the control device 14 shown in FIG. 1 by virtue of the output 16 of the device 15 for arc detection being monitored. Step S 22 is repeated until an arc is detected. When an arc has been detected, the method is continued in a step S 23.

In step S 23, all of the semiconductor switches 12.1-12.$n$ are now actuated and thus closed. The closing of the semiconductor switches 12.1-12.$n$ is performed in this case substantially simultaneously, wherein there may be small differences in the switching time, for example owing to a program execution within the control device 14, but this is not essential. This applies in the context of the application in all cases in which events are represented as "simultaneous".

In a subsequent step S 24, the electromechanical switches 11.1-11.$n$ are in turn opened simultaneously. In the exemplary embodiment illustrated in FIG. 1, in which the switches 11.1-11.$n$ are normally closed switches, this takes place by energizing the corresponding relay or contactor control coils. It is likewise possible for electromechanical switches to use normally open electromechanical switches, with the result that, in this step, a previously existing energization is cleared. It is likewise possible for bistable relays to be used as electromechanical switches 11.1-11.$n$. These bistable relays can assume two stable switching states which are different from one another in the de-energized state. In this case, a current pulse is capable of switching over from one stable switching state to the respective other stable switching state. Since, in step S 23, the parallel semiconductor switches 12.1-12.$n$ have been closed, in this step S 24 the switches 11.1-11.$n$ can be opened without an arc being able to form at the switching contacts. Furthermore, in step S 24, a count variable i is set to the value zero.

In a following step S 25, first the count variable i is incremented by one and consequently has the value i=1 in the first pass. The count variable i is then used for addressing various switching units 10.$i$ and the switches 11.$i$ or semiconductor switches 12.$i$ thereof. Therefore, in the first pass, the semiconductor switch 12.1 is opened and thus the PV subgenerator 2.1 is decoupled from the inverter, whereas the PV subgenerators 2.2 to 2.$n$ continue to be connected to the inverter 5, as before.

In a following step S 26, similarly to step S 22, an enquiry is made to ascertain whether an arc is detected in the DC circuit. If an arc is no longer identified, it can be assumed that a previously existing arc identified in step S 22 has been quenched by the PV subgenerator 2.$i$ being decoupled from the DC circuit. In this case, the method branches to step S 27, in which signaling is performed to indicate that an arc has been identified in the PV subgenerator 2.$i$, i.e. in the first pass in the PV subgenerator 2.1. Once it has been signaled that the arc localized in the PV subgenerator 2.$i$ has been quenched successfully, and there is no longer an arc present in the PV system 1, the method can in principle be terminated. In this case, the method only comprises the decoupling of a subset of current sources from the load, wherein the subset is smaller than the total number of current sources. The PV subgenerator 2.$i$ in which the arc has been localized is now isolated from the common load 5 expediently permanently, but at least for the duration of required repair and maintenance work on this PV subgenerator 2.$i$. If required, this isolation is a galvanic isolation or a galvanic isolation at all poles. Apart from the PV subgenerator 2.$i$ in which the arc has been localized, however, all remaining PV subgenerators in which no arc was present can be connected to the common load 5 again. This connection is performed, for example, by closing all of the remaining semiconductor switches 12.1-12.$n$ (apart from the semiconductor switch 12.$i$ of the affected PV subgenerator) in case they are not already closed, closing all of the remaining electromechanical switches 11.1-11.$n$ (apart from the electromechanical switch 11.$i$ of the affected PV subgenerator) and finally opening all of the remaining semiconductor switches. In an alternate embodiment, the semiconductor switches can also remain closed. Because the impedance of the electromechanical switches is typically low compared to that of the semiconductor switches, current will still tend to flow largely over the electromechanical switches if the semiconductor switches also remain closed. However, in the case that an electromechanical switch fails, having the associated semiconductor switch closed provides a fail-safe measure in that current can still flow. By this measure an arc which may be generated at the contacts of electromechanical switch which fails can effectively be suppressed.

In order to implement galvanic isolation of the affected PV subgenerator 2.$i$ in which the arc has been localized and quenched, it may be necessary to provide further electromechanical switching units (contactors) in each case in the current paths 3.1-3.$n$ in series with the switching units 10.1-10.$n$. If galvanic isolation at all poles of the generator is required, electromechanical switching units (contactors) need to be provided in the current paths 3.1-3.$n$ on each of the two sides of the PV subgenerators, as a deviation from the abovementioned case. These further electromechanical switching units (contactors) are not illustrated in FIG. 1 for reasons of clarity.

In the illustrated form of the PV system 1 and the method, it is possible to localize a series arc and to signal this in the step S 27. A series arc is an arc which occurs in a series circuit between the current source, i.e. in this case one of the PV subgenerators 2.1-2.$n$, and the load. It is necessary to distinguish between this and a parallel arc, which is formed in a parallel circuit with the current source, i.e. one of the PV subgenerators 2.1-2.$n$ (or some of the PV subgenerators). Since an arc in parallel with one of the PV subgenerators 2.1-2.$n$ would not be quenched by the switching unit 10.1-10.$n$ by the disconnection of the corresponding PV subgenerator 2.1-2.$n$, such a parallel arc cannot be localized by the arrangement illustrated. When using switching units which are arranged in such a way that they can short-circuit the PV subgenerators 2.1-2.$n$ selectively, the method described here can also be used for localizing parallel arcs, however.

Since in general the exclusion of a specific type of arc (parallel arc or series arc) does not take place, it may be advantageous to optionally additionally also implement the identification or quenching method for a parallel arc. In this case, for example, a further method step is inserted between step S 25 and S 26, in which further method step the further semiconductor switch 17.$i$, i.e. the further semiconductor switch 17.1 in the first pass, is closed. Since in this case the PV subgenerator 2.$i$ is already decoupled from the common load owing to the open switch 11.$i$ and the open semiconductor switch 12.$i$, this PV subgenerator 2.$i$ is therefore short-circuited selectively. The supply voltage is thus drawn from a parallel arc which may be burning in this PV subgenerator 2.$i$, and the parallel arc is quenched.

If, in step S 26, an arc is still detected, the method is continued with a step S 28, in which the semiconductor switch 12.$i$, i.e. again the semiconductor switch 12.1 in the first pass, is closed again. Possibly, in this step, the further semiconductor switch 17.$i$ is also opened again. The corresponding PV subgenerator 2.$i$, the PV subgenerator 2.1 in the first pass, is therefore connected to the inverter 5 again.

In a subsequent step S 29, an enquiry is made as to ascertain whether the counter variable i has already reached the value n of the number of existing PV subgenerators 2.1-2.$n$. If the counter variable i has not yet reached the value of the number n, the method branches back to step S 25. In step S 25, the counter variable is first incremented, i.e. set to the value i=2, for example. Then, the remainder of step S 25 and step S 26 and possibly steps S 27 or S 28, S 29 are repeated in respect of the PV subgenerator 2.2 and the corresponding semiconductor switch 11.2. In this way, the individual PV subgenerators 2.1-2.$n$ are disconnected from the inverter 5 successively, optionally short-circuited selectively and possibly connected again if neither a series arc nor a parallel arc has been localized in the disconnected PV subgenerator 2.1-2.$n$. In this case, the speed at which the PV subgenerators 2.1-2.3 can be disconnected and connected again is determined substantially only by the duration of the arc detection in step S 26. The switching time of an electromechanical switch 11.1-11.n only needs to be taken into consideration once in step S 24, whereas, in a method in accordance with the prior art in which the sequential disconnection and reconnection is performed via the electromechanical switches 11.1-11.n, this occurs n times in the course of the method.

If, in step S 29, it is established that the counter variable i has already reached the value of the number n, the method is continued with a step S 30.

The method can only reach this step S 30 when the arc could not be quenched and therefore localized in any of the PV subgenerators 2.1-2.n. There may be a number of reasons for this. For example, an interference signal may erroneously have been considered to be an arc. Such an interference signal may have been coupled into the PV system 1 by an external interference transmitter, for example. Provision can now be made for parameters of the arc detection by the device 15 for arc detection to be modified, in step S 30, in order to become insensitive to the interference signal. For example, provision can be made for a frequency or a frequency range in which the device 15 for arc detection is sensitive to be shifted. The method is then continued, in step S 21, with the newly determined parameters for the arc detection from the start. In an alternative configuration of the method, it is also possible for disconnection of the PV system 1 to be performed in step S 30, if appropriate with simultaneous short-circuiting of the DC input of the inverter 5 for quenching a possible parallel arc.

Figure 2:
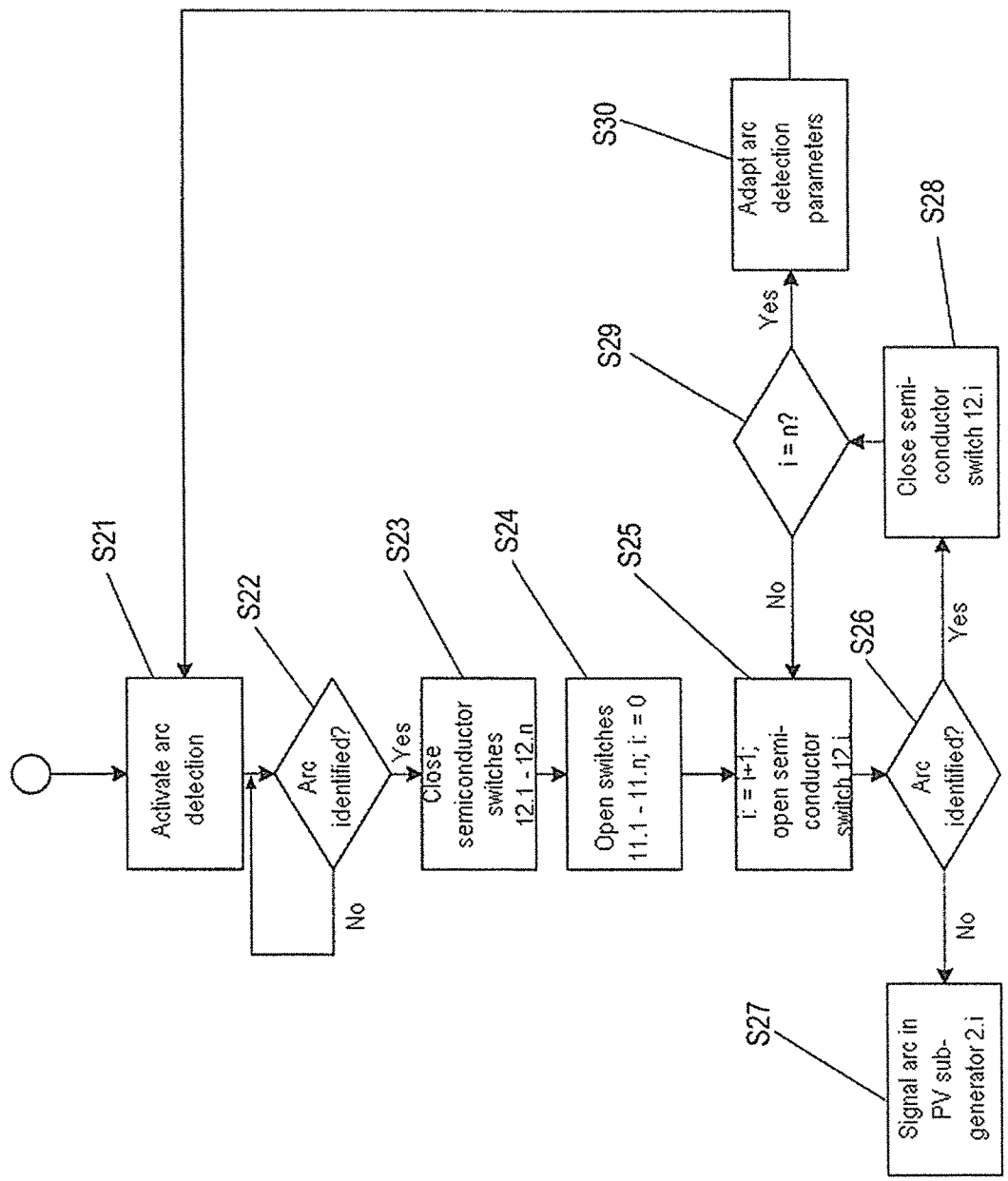
FIG. 2 shows a flowchart of a method for localizing an arc.

FIG. 2 illustrates that the method decouples individual PV subgenerators 2.1 to 2.n from the common load 5 in a constant and predetermined sequence. It is noted that the order of the sequence in which the PV subgenerators 2.1 to 2.n are decoupled and possibly short-circuited can in principle be altered as desired. In order to localize an arc as quickly as possible, however, it may be advantageous not to fixedly predetermine the sequence of the decoupling of individual PV subgenerators 2.1 to 2.n once, but to do this individually on a case by case basis on the basis of further measurements, for example. It is possible, for example, for a statement to be made on the basis of signals detected within the individual PV subgenerators 2.1 to 2.n in respect of the probability of an identified arc being localized within a specific PV subgenerator 2.1 to 2.n. The individual PV subgenerators 2.1 to 2.n can then be decoupled and possibly short-circuited with descending probability for the presence of the arc in the respective PV subgenerator 2.1 to 2.n.

Figure 3:
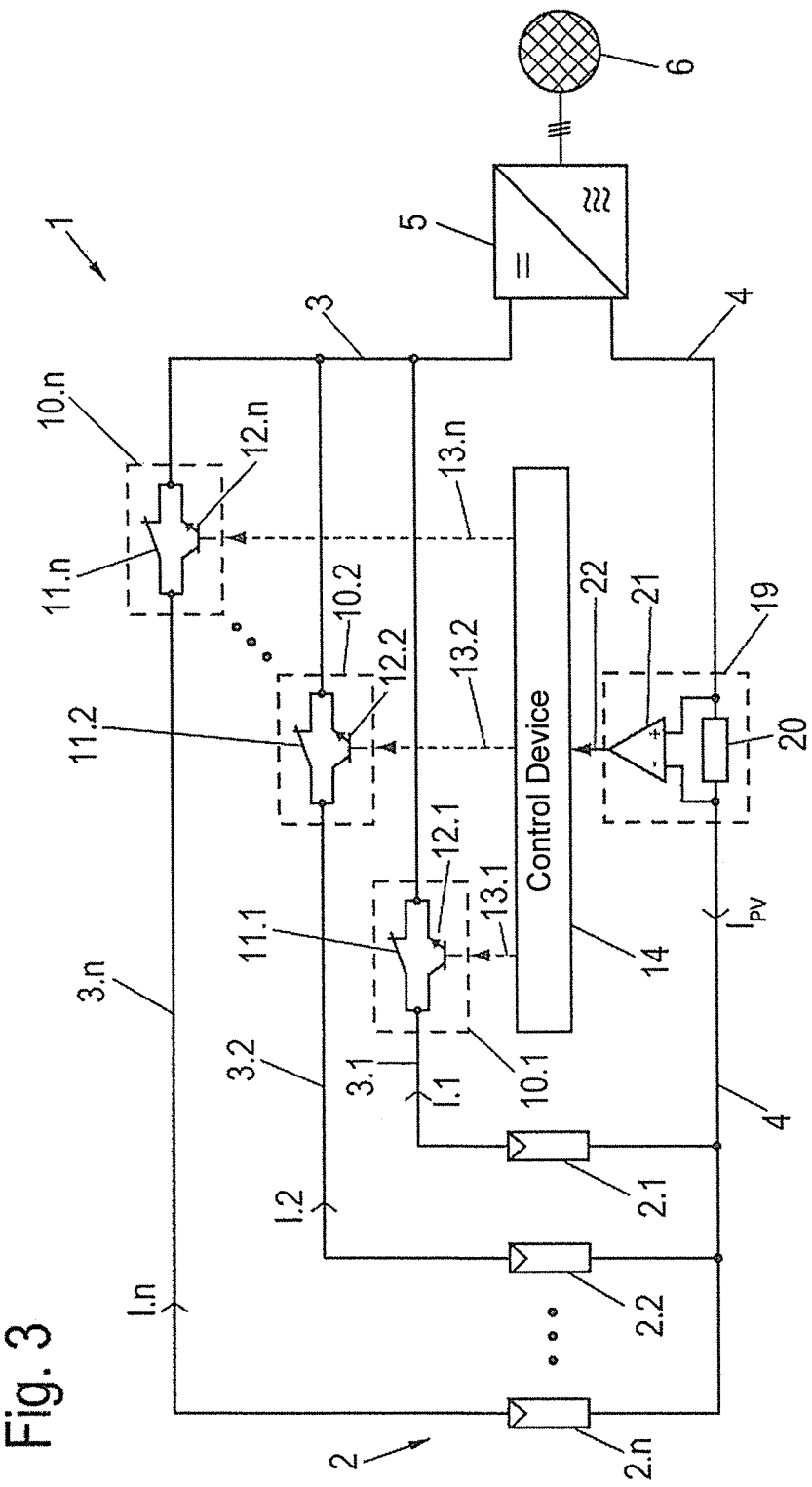
FIG. 3 shows a further block circuit diagram of a PV system.

FIG. 3 illustrates, in the form of a block circuit diagram similar to that in FIG. 1, a further PV system 1. Identical reference symbols in this figure characterize the same or functionally identical elements as in the exemplary embodiment in FIG. 1. In respect of the basic design of the PV system 1, reference is made to the exemplary embodiment in FIG. 1.

In contrast to the PV system 1 illustrated in FIG. 1, in the exemplary embodiment shown in FIG. 3, a current measurement device 19 is provided that is looped into the DC line 4. The device 15 for arc detection, as well as the further switching units 17.1-17.n with their control lines 18.1-18.n, are not illustrated in FIG. 3, but can additionally likewise be provided.

The current measurement device 19 comprises a current measuring resistor 20, at which a voltage drop occurs during operation of the PV system 1. The voltage drop, which is measured, is proportional to a current $I_{PV}$ flowing through the DC line 4 and therefore the PV generator 2. The voltage drop across the current measuring resistor 18 is measured via a differential amplifier 21 and output at a signal output 22 of the current measurement device 19 and made available to the control device 14. The embodiment of the current measurement device 19 with a current measuring resistor 20 is in this case purely by way of example; other measurement methods for measuring the level of the current $I_{PV}$ can likewise be used, for example Hall sensors.

A measurement of the total current flowing through the PV generator 2 is possible via the current measurement device 19. In specific cases, however, it is desirable to determine the level of a partial current I.1 to I.n flowing in one of the current paths 3.1-3.n through the individual PV generators 2.1-2.n. For example, it can be concluded that there is a possible partial shadowing situation on the basis of the partial currents I.1-I.n, or a fault can be localized in the PV subgenerator.

Figure 4:
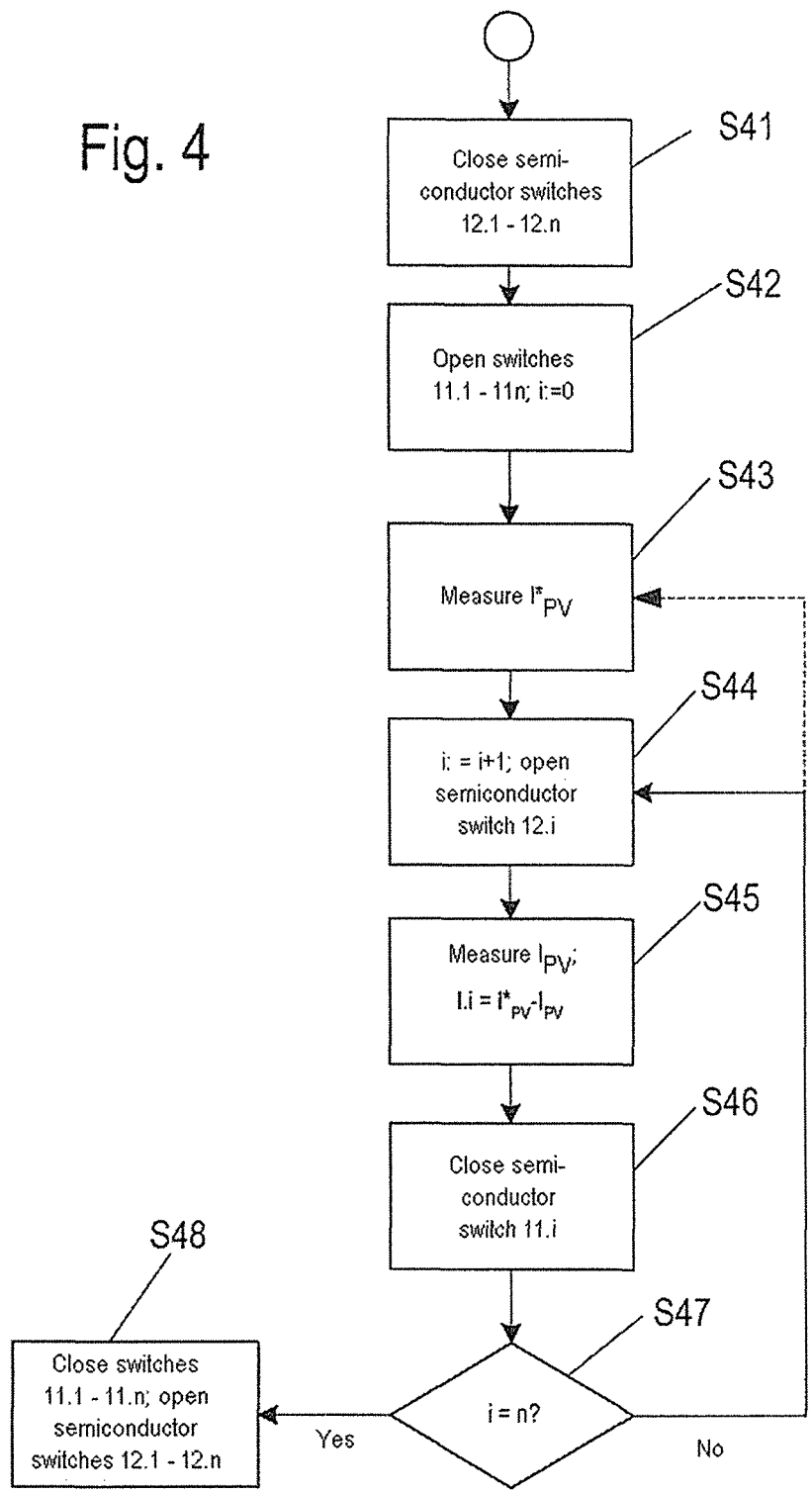
FIG. 4 shows a flowchart of a method for partial current measurement.
Figure 5:
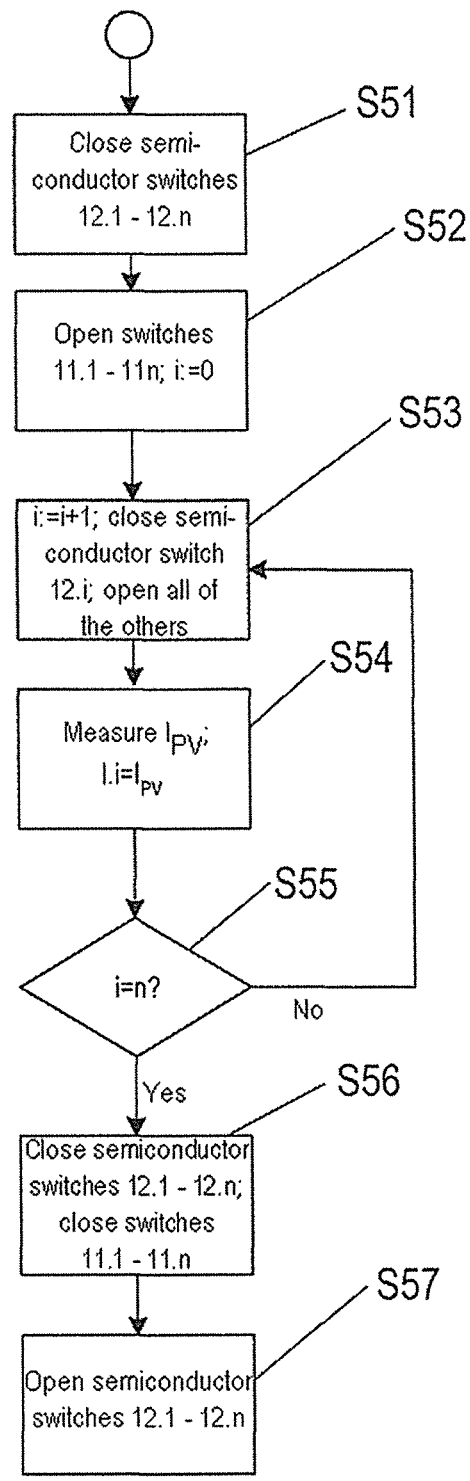
FIG. 5 shows a flowchart of a further method for partial current measurement.

In FIGS. 4 and 5, a method for determining partial currents through the individual PV subgenerators is specified below in each case on the basis of a flowchart, wherein these methods each make use of a method according to the application for sequentially disconnecting or connecting current sources from or to a common load. Both methods are explained by way of example with reference to the PV system 1 shown in FIG. 3. In both cases, it is assumed that the PV system 1 is in a normal operating state, in which all of the PV subgenerators 2.1-2.n are connected to the inverter 5, wherein first the electromechanical switches 11.1-11.n are closed and the semiconductor switches 12.1-12.n are open.

In a first step S 41 of the method illustrated in FIG. 4, first all of the semiconductor switches 12.1-12.n are actuated and closed. In a subsequent step S 42, all electromechanical switches 11.1-11.n are then opened. As already mentioned in connection with steps S 23 and S 24 in FIG. 2, opening of the electromechanical switches 11.1-11.n is thus possible without the risk of the occurrence of an arc. Furthermore, in step S 41, a count variable i is defined and set to the value zero.

In a subsequent step S 43, a current $I^*_{PV}$ is measured. This current is then referred to as the total current since it results as the sum of all of the partial currents in the current paths 3.1-3.n.

In a following step S 44, first the count variable i is incremented by 1. Then the semiconductor switch 11.i is opened and thus the PV subgenerator 2.i decoupled from the inverter 5.

In a step S 45, a current $I_{PV}$ is then measured in a further measurement. The current $I_{PV}$ reproduces the current through the entire PV generator 2 with the exception of the PV subgenerator 2.i. The partial current I.i flowing in the current path 3.i through the PV subgenerator 2.i then results from the difference between the total current $I^*_{PV}$ measured in step S 43 and the current $I_{PV}$ measured in step S 45.

In a following step S 46, the semiconductor switch 11.i is closed again and the PV subgenerator 2.i is correspondingly coupled to the inverter 5 again.

In a subsequent step S 47, a check is performed to ascertain whether the counter variable i has already reached the value n of the number of PV subgenerators 2.1-2.n. If this is not the case, the method branches back to step S 44. There, the counter variable i is incremented by the value 1 and the remainder of step S 44 and steps S 45 to S 47 are implemented again. In this way, the partial current I.1-I.n through the individual PV subgenerators 2.1-2.3 is determined successively.

The method ends when it is established in step S 47 that the counter variable corresponds to the number n of PV subgenerators 2.1-2.n, whereupon the method is continued with a step S 48 and is ended. In step S 48, first all of the electromechanical switches 11.1-11.n are closed and all of the associated semiconductor switches 12.1-12.n are opened.

In an alternative configuration of the method, which is indicated by a dashed arrow in the flowchart in FIG. 4, the method branches back from step S 47 not to step S 44 but to step S 43. In this method, therefore, the total current I*$_{PV}$ is in any event measured again prior to the difference forming in step S 45. The method is thus particularly suitable for very large PV systems 1, in which the total measurement time is so great that, under certain circumstances, a notable change in the total current I*$_{PV}$ can be observed in the course of the total measurement time, for example owing to changing incident radiation conditions.

FIG. 5 shows an alternative method to FIG. 4, for example. The method starts with steps S 51 and S 52, which precisely correspond to steps S 41 and S 42 in FIG. 4, and therefore reference is hereby made to the description relating to the figure. Also in step 53—analogue to step S 42 in FIG. 4—a count variable i is defined and is set to the value zero.

In a subsequent step S 53, after first incrementing the count variable i by 1, all of the semiconductor switches 12.1-12.n apart from the semiconductor switch 12.i, i.e. the semiconductor switch 12.1 in the first pass, are opened. In other words, only the semiconductor switch 12.i is closed, with the result that only the PV subgenerator 2.i is connected to the inverter 5. In a following step S 54, the current I$_{PV}$ is measured, which therefore directly corresponds to the partial current I.i in the current path 3.i through the PV subgenerator 2.i.

In a subsequent step S 55, an enquiry is made to ascertain whether the counter variable i corresponds to the number n of PV subgenerators. If this is not the case, the method branches back to step S 53, as a result of which the partial current I.i through the next PV subgenerator 2.i is measured correspondingly after incrementation of the counter variable i. If, in step S 55, it is established that all of the partial currents I.1-I.n have been measured, the method is continued in a step S 56, in which, after closing of all of the semiconductor switches 12.1-12.n, all of the electromechanical switches 11.1-11.n are also closed. The semiconductor switches 12.1-12.n are then opened again in a step 57. However, this step S 57 should be considered as optional since it is in principle also conceivable for the PV subgenerators 2.1-2.n to continue to be operated both with semiconductor switches 12.1-12.n closed and with electromechanical switches 11.1-11.n closed during normal operation of the PV generator. This would have the advantage that, in the event of unintentional opening of an electromechanical switch 11.1-11.n, for example owing to a relay defect, the striking of an arc is prevented at the contact points of the electromechanical switch. The closing of the semiconductor switches 12.1-12.n during the actuation of the switches 11.1-11.n protects the contacts of the switches 11.1-11.n from contact erosion on contact bouncing.

In an alternative configuration of the method, starting from a state in which all of the switches 11.1-11.n and semiconductor switches 12.1-12.n are open, the semiconductor switches 12.i, where i=1 to n, can be closed successively and in each case the current rise resulting after closing of a further one of the semiconductor switches 12.i can be determined. The current rise indicates the level of the partial current through the PV subgenerator 2.i.

The methods illustrated in FIGS. 4 and 5 both enable quick measurement of the partial currents through the different PV subgenerators in a multiplexing method without individual current measurement devices associated with the PV subgenerators being provided.

Alternatively, it is also possible to define, as start state of the methods shown in FIGS. 4 and 5, a normal state in which both the electromechanical switches 11.1-11.n and the semiconductor switches 12.1-12.n connected in parallel are closed. For this case, steps S 41, S 51 and S 57 are no longer required in the method sequences illustrated. In the method sequence shown in FIG. 4, furthermore the last part of the method step S 48 in which all of the semiconductor switches 12.1-12.n are opened again is not required, while the substep of closing all of the electromechanical switches 11.1-11.n is still implemented. Analogously, therefore, a method sequence as shown in FIG. 2 is also conceivable, in which the normal state is characterized by the fact that both all of the electromechanical switches 11.1-11.n and all of the semiconductor switches 12.1-12.n are closed.

LIST OF REFERENCE SYMBOLS

1 PV system
2 PV generator
2.1-2.n PV subgenerator
3, 4 DC line
3.1-3.n Current path
5 Inverter
6 Power supply system
10.1-10.n Switching unit
11.1-11.n Electromechanical switch
12.1-12.n Semiconductor switch
13.1-13.n Control line
14 Control device
15 Device for arc detection
16 Signal output
17.1-17.n Further switching unit
18.1-18.n Control line
19 Current measurement device
20 Current measuring resistor (shunt)
21 Differential amplifier
22 Measurement output
S21-S30 Method steps
S41-S48 Method steps
S51-S57 Method steps

The invention claimed is:

1. A method for localizing an identified arc in a PV-system comprising a plurality of PV-subgenerators as electrical current sources that are connected in parallel to a DC-input circuit of an inverter as a common load, and a device for arc detection looped into a common DC line by sequentially disconnecting at least two of the plurality of PV-subgenerators as electrical current sources from the DC-input circuit of the inverter as the common load,
  wherein the PV-subgenerators are each connected to the DC-input circuit of the inverter via a switching unit,
  wherein each switching unit comprises a parallel circuit comprising an electromechanically actuated switch and an associated semiconductor switch, the method comprising the following acts:
  during a first act: closing semiconductor switches which are associated with respective closed electromechanical switches, if the semiconductor switches are not already closed, and opening the respective closed electromechanical switches, and
  during a second act: sequentially opening at least two of the semiconductor switches which were closed during the first act or which were already closed.

2. The method according to claim 1, wherein a semiconductor switch actuated during the sequential opening remains opened until all of the at least two of the semiconductor switches to be opened sequentially have been opened.

3. The method according to claim 1, wherein a semiconductor switch actuated during the sequential opening is first closed again before a next semiconductor switch is opened sequentially.

4. The method according to claim 1, wherein the sequential opening of the semiconductor switches is characterized by an opening of in each case an individual one of the semiconductor switches.

5. The method according to claim 1, wherein the sequential opening of the semiconductor switches is characterized by a simultaneous opening of in each case a plurality of the semiconductor switches, wherein a first group of semiconductor switches open together at a first time and a second group of semiconductor switches open together at a second, later time such that the first and second groups of semiconductor switches open in a sequential fashion with respect to one another.

6. The method according to claim 1, wherein, after completion of the sequential opening of the semiconductor switches, the following acts are implemented:
establishing a subset of current sources that are intended to be connected to the common load again;
closing all of the semiconductor switches of the current sources that belong to the subset if the semiconductor switches are not already closed, and
closing all of the electromechanically actuated switches of the current sources that belong to the subset.

7. The method according to claim 1, further comprising:
prior to the first and second acts, identifying whether an arc is present, and
identifying which of the current sources, if any, is associated with the arc by identifying whether the arc is still present in each case of sequential opening.

8. The method according to claim 1, wherein the opening of the respective closed electromechanical switches takes place simultaneously or near simultaneously.

9. A method for localizing an identified arc in a PV-system comprising a plurality of PV-subgenerators as electrical current sources that are connected in parallel to a DC-input circuit of an inverter as a common load, and a device for arc detection looped into a common DC line by sequentially connecting at least two PV-subgenerators as electrical current sources to the DC-input circuit of the inverter as a common load,
wherein the PV-subgenerators are each connected to the DC-input circuit of the inverter via a switching unit,
wherein each switching unit comprises a parallel circuit comprising an electromechanically actuated switch and an associated semiconductor switch, the method comprising:
during a first act: closing semiconductor switches that are associated with respective closed electromechanical switches, if the semiconductor switches are not already closed, and opening the respective electromechanical switches,
during a second act: opening a plurality of the semiconductor switches, and
during a third act: sequentially closing at least two of the plurality of semiconductor switches opened during the second act.

10. The method according to claim 9, further comprising:
measuring a current to or from the common load with at least one of the plurality of semiconductor switches closed and the others of the plurality of semiconductor switches opened.

11. The method according to claim 9, wherein the sequentially closed semiconductor switch is first opened again before a next semiconductor switch is sequentially closed.

12. The method according to claim 9, wherein, after completion of the sequential closing of the semiconductor switches, the associated electromechanically actuated switches are closed.

13. The method according to claim 9, wherein the sequential closing of the semiconductor switches is characterized by a closing of in each case an individual one of the semiconductor switches.

14. The method according to claim 9, wherein the sequential closing of the semiconductor switches is characterized by a simultaneous closing of in each case a plurality of the semiconductor switches, wherein a first group of semiconductor switches close together at a first time and a second group of semiconductor switches close together at a second, later time such that the first and second groups of semiconductor switches close in a sequential fashion with respect to one another.

15. The method according to claim 9, wherein, after completion of the sequential closing of the semiconductor switches, the following acts are implemented:
establishing a subset of current sources that are intended to be connected to the common load again;
closing all of the semiconductor switches of the current sources that belong to the subset if the semiconductor switches are not already closed, and
closing all of the electromechanically actuated switches of the current sources that belong to the subset.

16. The method according to claim 15, characterized in that the current sources that are not intended to be connected to the common load again are galvanically isolated from the common load.

17. A photovoltaic (PV) system, comprising:
a photovoltaic (PV) generator comprising at least two PV subgenerators as parallel-connected electrical current sources connected to a DC input of an inverter as a common load;
at least two switching units that respectively couple the at least two PV subgenerators to the DC input of the inverter, wherein each switching unit comprises a parallel circuit comprising an electromechanically actuated switch and an associated semiconductor switch which are arranged between a PV subgenerator and the DC input of the inverter; and
a control device to sequentially open the semiconductor switches with the electromechanical switches being opened or sequentially close the semiconductor switches with the electromechanical switches being opened to evaluate electrical characteristics between individual PV subgenerators and the DC input of the inverter via a device for arc detection or a current measurement device that is looped into a common DC line, wherein the PV-system further comprising: an arc detection device to signal if an arc is present and to provide an output signal indicating the presence of the arc, if any, to the control device; wherein, when an arc is present, the control device is configured to: during a first act: close semiconductor switches that are associated with respective closed electromechanical switches, if the semiconductor switches are not already closed, and open the respective electromechanical switches, and during a second act: sequentially open at least two of the semiconductor switches which were closed during the first act or which were already closed.

18. The PV system according to claim 17, wherein, after completion of the sequential closing or sequential opening of the semiconductor switches, the control device is configured to implement the following acts:
establish a subset of current sources that are intended to be connected to the DC input of the inverter again;
close all of the semiconductor switches of the current sources that belong to the subset if the semiconductor switches are not already closed, and
close all of the electromechanically actuated switches of the current sources that belong to the subset.

19. A photovoltaic (PV) system, comprising:
a photovoltaic (PV) generator comprising at least two PV subgenerators as parallel-connected electrical current sources connected to a DC input of an inverter as a common load;
at least two switching units that respectively couple the at least two PV subgenerators to the DC input of the inverter, wherein each switching unit comprises a parallel circuit comprising an electromechanically actuated switch and an associated semiconductor switch which are arranged between a PV subgenerator and the DC input of the inverter; and
a control device to sequentially open the semiconductor switches with the electromechanical switches being opened or sequentially close the semiconductor switches with the electromechanical switches being opened to evaluate electrical characteristics between individual PV subgenerators and the DC input of the inverter via a device for arc detection or a current measurement device that is looped into a common DC line, wherein the PV-system further comprising: the current measurement device to measure current from the PV generator; wherein, to facilitate current measurement, the control device is configured to:
during a first act: close semiconductor switches that are associated with respective closed electromechanical switches, if the semiconductor switches are not already closed, and open the respective electromechanical switches, and
during a second act: sequentially open at least two of the semiconductor switches which were closed during the first act or which were already closed.

20. A photovoltaic (PV) system, comprising:
a photovoltaic (PV) generator comprising at least two PV subgenerators as parallel-connected electrical current sources connected to a DC input of an inverter as a common load;
at least two switching units that respectively couple the at least two PV subgenerators to the DC input of the inverter, wherein each switching unit comprises a parallel circuit comprising an electromechanically actuated switch and an associated semiconductor switch which are arranged between a PV subgenerator and the DC input of the inverter; and
a control device to sequentially open the semiconductor switches with the electromechanical switches being opened or sequentially close the semiconductor switches with the electromechanical switches being opened to evaluate electrical characteristics between individual PV subgenerators and the DC input of the inverter via a device for arc detection or a current measurement device that is looped into a common DC line, wherein the PV-system further comprising: the current measurement device to measure current from the PV generator; wherein, to facilitate current measurement, the control device is configured to: during a first act: close semiconductor switches that are associated with respective closed electromechanical switches, if the semiconductor switches are not already closed, and open the respective electromechanical switches, during a second act: open a plurality of the semiconductor switches, and during a third act: sequentially close at least two of the semiconductor switches opened during the second act.

21. A method for determining a partial current through an individual PV-subgenerator in a PV-system comprising a plurality of PV-subgenerators that are connected in parallel to a DC-input circuit of an inverter, and a current measurement device looped into a common DC line by sequentially disconnecting at least two PV-subgenerators as electrical current sources from the DC-input circuit of the inverter as a common load,
wherein the PV-subgenerators are each connected to the DC-input circuit of the inverter via a switching unit,
wherein each switching unit comprises a parallel circuit comprising an electromechanically actuated switch and an associated semiconductor switch, the method comprising the following acts:
during a first act: closing semiconductor switches which are associated with respective closed electromechanical switches, if the semiconductor switches are not already closed, and opening the respective closed electromechanical switches, and
during a second act: sequentially opening at least two of the semiconductor switches which were closed during the first act or which were already closed.

22. The method according to claim 21, further comprising:
measuring a total current to or from the common load with the semiconductor switches closed; and
during the second act, measuring a current for each sequential opening and determining a partial current for a current source based on the measured current.

23. The method according to claim 21, wherein a semiconductor switch actuated during the sequential opening is first closed again before a next semiconductor switch is opened sequentially.

24. The method according to claim 21, wherein the sequential opening of the semiconductor switches is characterized by an opening of in each case an individual one of the semiconductor switches.

25. A method for determining a partial current through an individual PV-subgenerator in a PV-system comprising a plurality of PV-subgenerators that are connected in parallel to a DC-input circuit of an inverter and a current measurement device looped into a common DC line by sequentially connecting at least two PV-subgenerators as electrical current sources to the DC-input circuit of the inverter as a common load,
wherein the PV-subgenerators are each connected to the DC-input circuit of the inverter via a switching unit,
wherein each switching unit comprises a parallel circuit comprising an electromechanically actuated switch and an associated semiconductor switch, the method comprising:
during a first act: closing semiconductor switches that are associated with respective closed electromechanical switches, if the semiconductor switches are not already closed, and opening the respective electromechanical switches, during a second act: opening a plurality of the semiconductor switches, and during a third act: sequentially closing at least two of the plurality of semiconductor switches opened during the second act.

26. The method according to claim 25, further comprising:

measuring a current to or from the common load with at least one of the plurality of semiconductor switches closed and the others of the plurality of semiconductor switches opened.

27. The method according to claim 25, wherein the sequentially closed semiconductor switch is first opened again before a next semiconductor switch is sequentially closed.

28. The method according to claim 25, wherein, after completion of the sequential closing of the semiconductor switches, the associated electromechanically actuated switches are closed.

29. The method according to claim 25, wherein the sequential closing of the semiconductor switches is characterized by a closing of in each case an individual one of the semiconductor switches.

* * * * *